(12) United States Patent
Zang et al.

(10) Patent No.: US 11,908,218 B2
(45) Date of Patent: Feb. 20, 2024

(54) DATA PROCESSING METHOD, DEVICE, AND ELECTRONIC APPARATUS (71) Applicant: Lenovo (Beijing) Co., Ltd., Beijing (CN)

(72) Inventors: Chendi Zang, Beijing (CN); Yaqiang Wu, Beijing (CN); Hui Li, Beijing (CN); Xinfeng Chang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 738 days.

(21) Appl. No.: 16/943,504

(22) Filed: Jul. 30, 2020

(65) Prior Publication Data

US 2021/0034852 A1   Feb. 4, 2021

(30) Foreign Application Priority Data

Jul. 31, 2019 (CN) .......................... 201910703038.8

(51) Int. Cl.
*G06V 30/412* (2022.01)
*G06F 40/109* (2020.01)
*G06V 30/414* (2022.01)
*G06V 30/416* (2022.01)

(52) U.S. Cl.
CPC .......... *G06V 30/412* (2022.01); *G06F 40/109* (2020.01); *G06V 30/414* (2022.01); *G06V 30/416* (2022.01)

(58) Field of Classification Search
CPC ...... G06F 40/109; G06F 40/103; G06F 16/34; G06V 30/416
See application file for complete search history.

(56) References Cited

U.S. PATENT DOCUMENTS

| 9,195,637 | B2 * | 11/2015 | Peraza | G06F 40/109 |
| 2004/0139400 | A1 * | 7/2004 | Allam | G06F 40/106 715/201 |
| 2004/0255244 | A1 * | 12/2004 | Filner | G06F 40/103 715/239 |
| 2006/0227153 | A1 * | 10/2006 | Anwar | G06T 3/0012 345/660 |
| 2008/0071768 | A1 * | 3/2008 | Atzel | G06Q 30/06 707/999.005 |
| 2012/0084703 | A1 * | 4/2012 | Lee | G06F 3/0483 715/776 |
| 2013/0326398 | A1 * | 12/2013 | Zuverink | G06F 3/0488 715/830 |
| 2014/0157116 | A1 * | 6/2014 | Guo | G06F 40/106 715/252 |
| 2018/0038710 | A1 * | 2/2018 | Shang | G01C 21/36 |
| 2019/0347053 | A1 * | 11/2019 | Aoyama | G06F 3/125 |
| 2020/0356222 | A1 * | 11/2020 | Clarke | G06F 16/447 |

FOREIGN PATENT DOCUMENTS

CN    101916167 A    12/2010

* cited by examiner

*Primary Examiner* — King Y Poon
*Assistant Examiner* — Michael L Burleson
(74) *Attorney, Agent, or Firm* — ANOVA LAW GROUP, PLLC (57) ABSTRACT A data processing method includes detecting a first operation for a first page, determining a layout type of the first page, the first page including a first section and a second section, and in response to the layout type being same as a preset type, adjusting a relative position between the first section and the second section so that both of the first section and the second section are visible when moving along a first direction in a display area.

17 Claims, 7 Drawing Sheets

DATA PROCESSING METHOD, DEVICE, AND ELECTRONIC APPARATUS

CROSS-REFERENCE TO RELATED APPLICATION

This application claims priority to Chinese Patent Application No. 201910703038.8, filed on Jul. 31, 2019, the entire content of which is incorporated herein by reference.

TECHNICAL FIELD

The present disclosure generally relates to the data processing technology field and, more particularly, to a data processing method, a device, and an electronic apparatus.

BACKGROUND

In some papers, journals, and magazines, column layout is often used to display related content. Since a font is often relatively small in the content displayed in a column, a user usually needs to enlarge the page when reading the content displayed in the column layout, and then read the content individually column by column. In this situation, after reading the content of the column, the user needs to drag the enlarged page to the lower left to move the beginning of the next column to the display area. However, in various applications, since the page has been enlarged, positioning of a relevant position of the content is not clear. As such, the user needs to repeatedly adjust the position of the page. Therefore, the user needs to perform cumbersome operations during reading, such that the user experience may not be smooth.

SUMMARY

Embodiments of the present disclosure provide a data processing method. The method includes detecting a first operation for a first page, determining a layout type of the first page, the first page including a first section and a second section, and in response to the layout type being same as a preset type, adjusting a relative position between the first section and the second section so that both of the first section and the second section are visible when moving along a first direction in a display area.

Embodiments of the present disclosure provide a data processing device, including an operation detection module, a layout determination module, a position adjustment module. The operation detection module is configured to detect a first operation for a first page. The layout determination module is configured to determine a layout type of the first page, the first page including a first section and a second section. The position adjustment module is configured to, in response to the layout type being same as a preset type, adjust a relative position between the first section and the second section so that both of the first section and the second section are visible when moving along a first direction in a display area.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION OF SOME EMBODIMENTS

A technical solution of the present disclosure is further described in detail in connection with accompanying drawings and specific embodiments. Described embodiments are merely some embodiments of the present disclosure, not all the embodiments. Based on embodiments of the present disclosure, other embodiments obtained by those of ordinary skill in the art without creativity effort are within the scope of the present disclosure.

Figure 1:
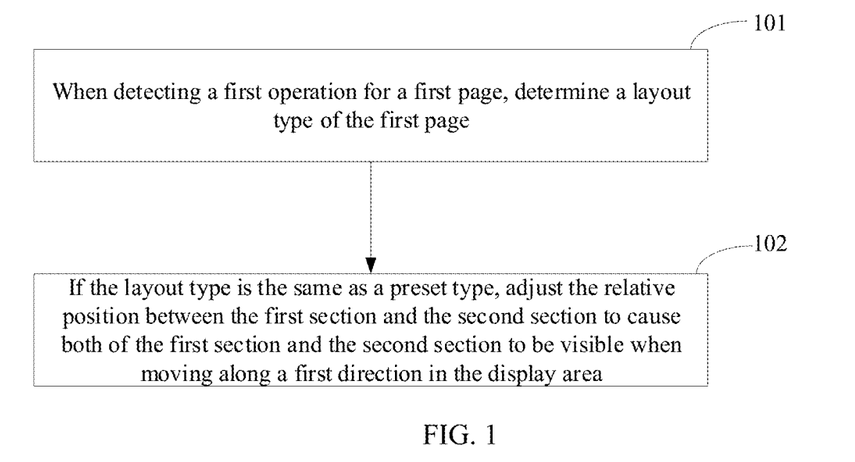
FIG. 1 illustrates a schematic flowchart of a data processing method according to some embodiments of the present disclosure.

FIG. 1 illustrates a schematic flowchart of a data processing method according to some embodiments of the present disclosure. Referring to FIG. 1, a data processing method includes the following processes.

At 101, when detecting a first operation for a first page, the method includes determining a layout type of the first page. The first page at least includes a first section and a second section.

The first page may include a browser page or an image display page of any document. The document may include but is not limited to word-containing content such as a journal, a magazine, a paper, a newspaper, etc. The first page at least includes the first section and the second section. A display area of the first section and a display area of the second section have an apparent dividing border. The border may include a visible border, such as a column dividing line. The border may include an invisible border, for example, a gap with a certain distance between the first section and the second section, which divides the first section and the second section.

In some embodiments, the first operation is not limited and may include an operation indicating that a user wants to read the content of the first page in detail. After determining that the user wants to read the content of the first page in detail, the method includes further detecting and determining the layout type of the first page.

At 102, if the layout type is the same as a preset type, the method includes adjusting the relative position between the first section and the second section to cause both of the first section and the second section to be visible when moving along a first direction in the display area.

In some embodiments, when the layout type of the first page is a normal single-page layout, that is, when the content of the document is arranged being displayed in a sequence from top to bottom as a whole, no specific processing is needed.

When the layout type if the first page is same as the preset type, for the preset type such as a column layout or a section layout, the method may include controlling and adjusting the relative position of the first section and the second section to cause both of the first section and the second section to be visible when moving along the first direction in the display area. As such, the user may read the content of the first page more conveniently.

Figure 2:
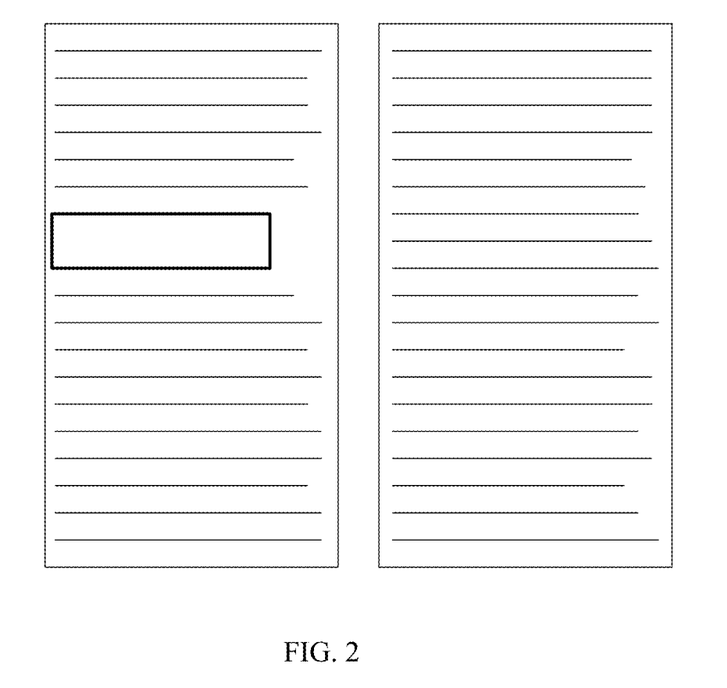
FIG. 2 illustrates a schematic view of a page displayed in a column layout according to some embodiments of the present disclosure.
Figure 3:
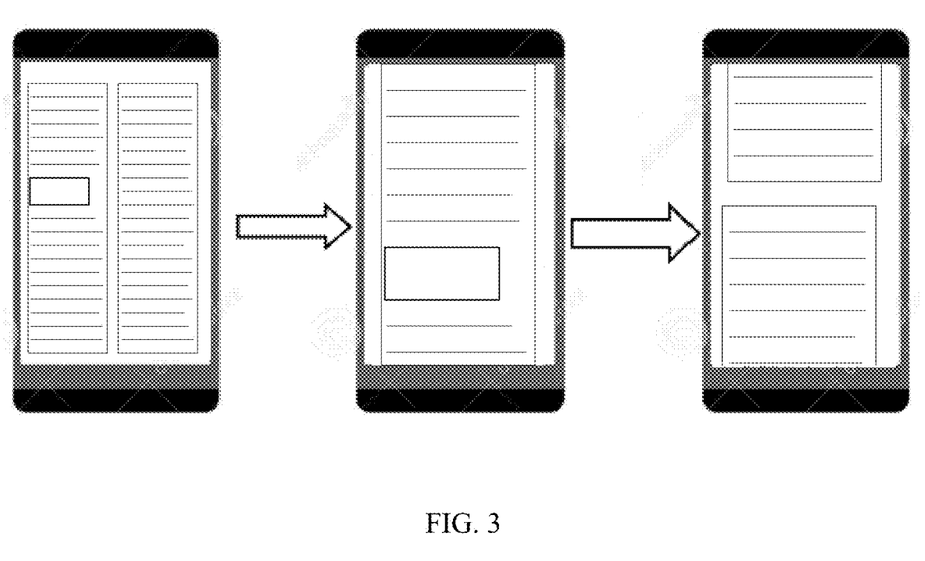
FIG. 3 illustrates a schematic diagram of a reading process according to some embodiments of the present disclosure.

FIG. 2 illustrates a schematic view of a page displayed in a column layout. The page includes the display contents of the two sections in the column layout, that is, the display content in the left column and the display content in the right column. As shown in FIG. 2, for example, the preset type is the column layout. Since the font of the content displayed in the column is relatively small, the user needs to enlarge the page to read the content. After reading the content of one column, the user needs to drag the enlarged page down to the left and repeatedly adjust the position of the page to move the beginning of the next column to the display area to continue reading. If the data processing method of embodiments of the present disclosure is used, the display content in the right column is adjusted to the position below the display content of the left column. As such, after reading the display content of the left column, the user does not need to drag the page down to the left but directly moves the page up or scrolls the scroll bar down to continue reading the display content of the right column. As such, the user saves the operation of adjusting the position and may read smoothly. FIG. 3 illustrates a schematic diagram of a reading process according to some embodiments of the present disclosure. As shown in FIG. 3, the left side shows the content of the document displayed in the column layout. By using the data processing method of embodiments of the present disclosure, the page is enlarged. After the display content on the right side of the page is adjusted to the position below the display content on the left side of the page, the user reads the display content (shown in the middle of FIG. 3) on the left side of the page first. After finishing reading corresponding content, the user directly scrolls up the display page, such that the original display content (shown on the right side of FIG. 3) on the right side of the page continues to be displayed below the display content on the left side of the page.

In some embodiments, when the data processing method detects a first operation, and the layout type of the first page is a target type, the data processing method automatically adjusts relative positions of contents of different sections in the first page. As such, all contents of the first page may be displayed along a direction in the display area. The user does not need to repeatedly adjust the display content in the display area from different directions, such that the user can read more smoothly, and user reading experience is improved.

In the above-described embodiments, the first operation may be implemented differently in different embodiments.

For example, in some embodiments, the first operation is a zoom-in operation. Thus, determining the layout type of the first page when detecting the first operation for the first page may include determining the layout type of the first page when detecting the zoom-in operation for the first page. In other embodiments, the first operation is a display rotation operation. Thus, determining the layout type of the first page when detecting the first operation for the first page includes determining the layout type of the first page when detecting that a display mode changes from a horizontal display mode to a vertical display mode. In the horizontal display mode, since the width is relatively large, the display width may display all the content of the page when the content of the page is displayed in the left and right two columns. When the display mode changes to the vertical display mode, to ensure clear font, the display width may only display the content of the page in one column, therefore, this situation may trigger the data processing method of embodiments of the present disclosure.

In the above-described embodiments, the first section and the second section may include a same first attribute. The first attribute may include but is not limited to width and font. That is, the first section and the second section have the same text format and layout width. In this case, adjusting the relative position between the first section and the second section to cause both of the first section and the second section to be visible when moving along the first direction in the display area includes the following processes. The relative position between the first section and the second section is adjusted to cause the second section to be located below the first section. Since the first section and the second section have the same width and font, the second section may be directly aligned below the first section. As such, the transition from the first section to the second section is smooth and does not affect the user reading experience.

When adjusting relative positions of contents of various sections, to ensure consistency of the text content of each of the sections, the method may include determining the sequence of the contents of various sections according to a certain rule. Therefore, adjusting the relative position between the first section and the second section to cause both of the first section and the second section to be visible when moving along the first direction in the display area includes the following processes. An arrangement sequence of the first section and the second section is determined according to the certain rule. The relative position between the first section and the second section is adjusted according to the arrangement sequence to cause both of the first section and the second section to be visible when moving along the first direction. For example, the content of each of the sections is arranged from top to bottom according to the sequence of the content of each of the sections from left to right. In other embodiments, the content of each of the sections is arranged from top to bottom according to the page number at the bottom of each section of the first page.

Figure 4:
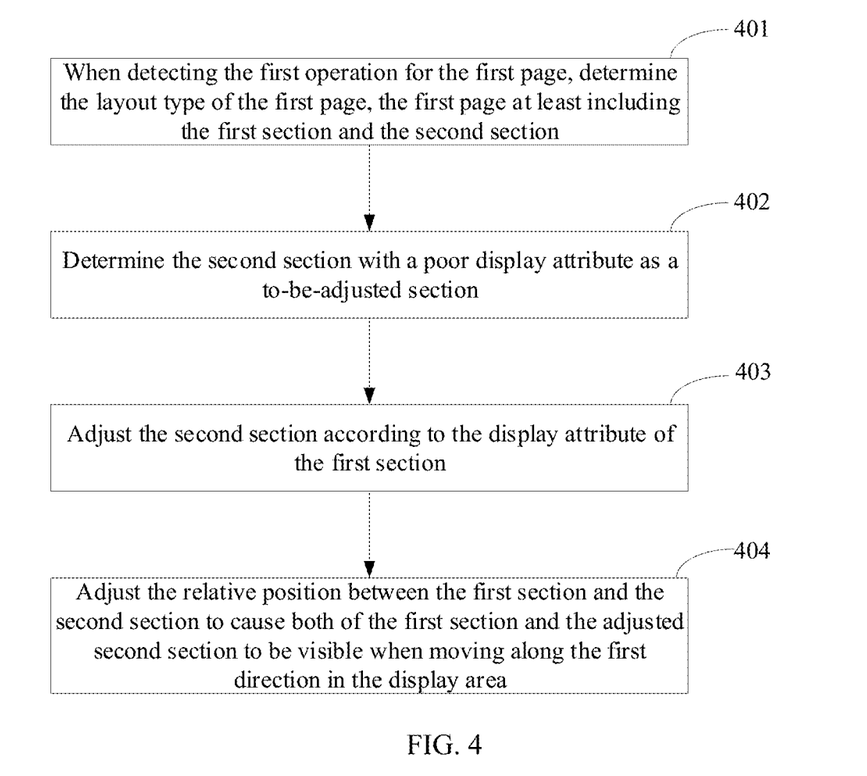
FIG. 4 illustrates a schematic flowchart of another data processing method according to some embodiments of the present disclosure.

In practical applications, the first section and the second section may include different attributes. For example, the first page is a browser page of a photographed magazine image. Due to a photographing angle, the display content on the left side of the page and the display content on the right side of the page displayed in the column layout have different sizes. For the processing method of such a situation, reference may be made to FIG. 4. FIG. 4 illustrates a schematic flowchart of another data processing method according to some embodiments of the present disclosure. In some embodiments, the first section and the second section have different first attributes. The first attribute may include but is not limited to width and fonts. As shown in FIG. 4, the data processing method may include the following processes.

At 401, when detecting the first operation for the first page, the method includes determining the layout type of the first page. The first page at least includes the first section and the second section.

At 402, the method includes determining the second section with a poor display attribute as a to-be-adjusted section.

The display attribute may include font clarity, font size, etc. Because of a photographing angle of the image, display content of a column of a close photographing point has a broader width and clearer font. Display content of a column of a far photographing point has a narrower width and blurrier font. In this situation, the column with the poorer display attribute (the display content of the column of the far photographing point) may be determined as the to-be-adjusted section. The display attribute of the to-be-adjusted section is optimized through a subsequent related calibration operation to facilitate the user to read.

At 403, the method includes adjusting the second section according to the display attribute of the first section.

After the to-be-adjusted section is determined, the display content with the poorer display attribute may be adjusted according to the related attribute value of the display content with the better display attribute. As such, the display attributes of both of the display contents may be adjusted to be nearly the same.

At 404, the method includes adjusting the relative position between the first section and the second section to cause both of the first section and the adjusted second section to be visible when moving along the first direction in the display area.

After the display attributes of the first section and the second section are adjusted to be the same, the relative position between the first section and the adjusted second section is adjusted. As such, both of the first section and the second section can be visible when moving along the first direction in the display area to facilitate the user to read.

In some embodiments, when the first section and the second section have different first attributes, the data processing method includes adjusting the display content with a poorer attribute according to the standard of the better display attribute first. Then, the data processing method includes adjusting the relative position of the first section and the second section to cause a similar view for the first section and the second section to improve the user reading experience.

Figure 5:
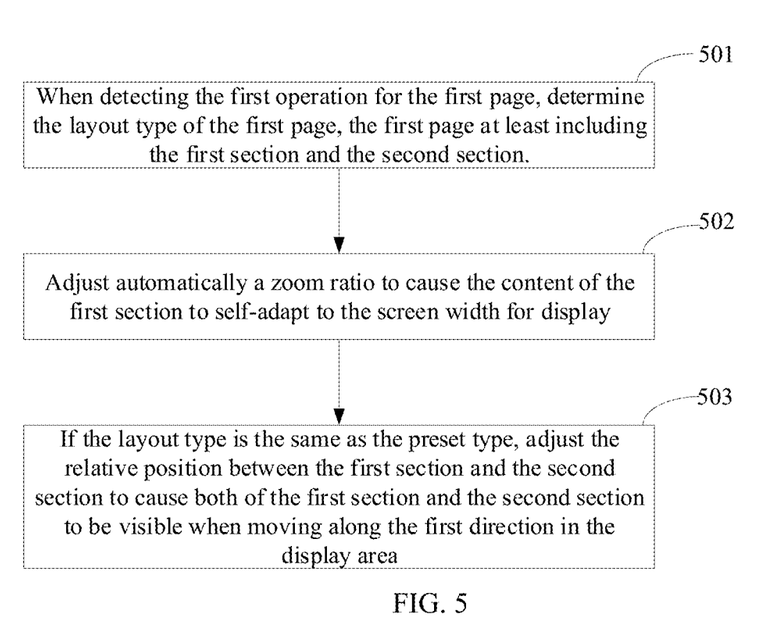
FIG. 5 illustrates a schematic flowchart of a third data processing method according to some embodiments of the present disclosure.

Based on the above-described embodiments of the present disclosure, FIG. 5 illustrates a schematic flowchart of a third data processing method according to some embodiments of the present disclosure. As shown in FIG. 5, a data processing method may include the following processes.

At 501, when detecting the first operation for the first page, the method includes determining the layout type of the first page. The first page at least includes the first section and the second section.

At 502, the method includes adjusting automatically a zoom ratio to cause the content of the first section to adapt to the screen width for display.

Since the font of the display content in the column layout is usually small, to recognize the text content clearly, the user needs to adjust and enlarge the first page. In some embodiments, the method may include automatically adjusting the zoom ratio to cause the content of the first section to adapt to the screen width for display. As such, when looking for the content of the first section, the user does not need to adjust the display page left and right but only up and down.

At 503, if the layout type is the same as the preset type, the method includes adjusting the relative position between the first section and the second section to cause both of the first section and the second section to be visible when moving along the first direction in the display area.

The execution sequence of process 502 and process 503 is not fixed as long as the two processes are executed after determining the layout type of the first page.

In some embodiments, after detecting the first operation for the first page and determining the layout type of the first page, the method may include automatically adjusting the zoom ratio for the content of the first section to adapt to the screen width for display. As such, the user may see the content of the first section and the content of the second section by only adjusting the position of the content in an up and down direction. Therefore, the user reading experience is improved.

Figure 6:
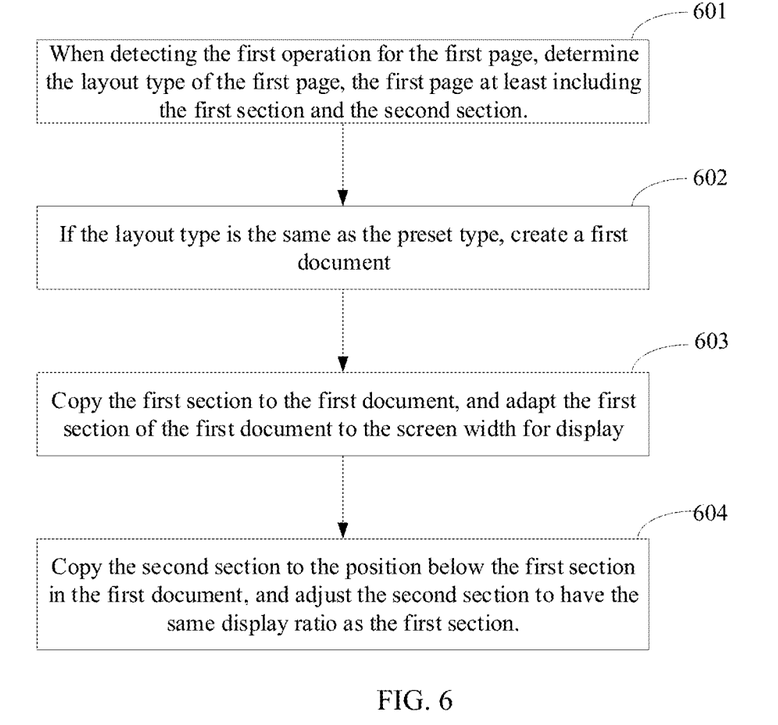
FIG. 6 illustrates a schematic flowchart of a fourth data processing method according to some embodiments of the present disclosure.

FIG. 6 illustrates a schematic flowchart of a fourth data processing method according to some embodiments of the present disclosure.

At 601, when detecting the first operation for the first page, the method includes determining the layout type of the first page. The first page at least includes the first section and the second section.

At 602, if the layout type is the same as the preset type, the method includes creating a first document.

In some situations, since the first page may be a page of a saved original document opened by the user, the user cannot directly edit the first page in the opened browser page of the first page. Therefore, in some embodiments, when the layout type of the first page is determined to be the same as the preset type, a first document is created to be used to edit and adjust the display contents of the different sections in the first page.

At 603, the method includes copying the first section to the first document, and the first section of the first document is adapted to the screen width for display.

Before the user edits the display content of different sections on the first page, the method includes copying the first section to the first document first and displaying the first section of the first document according to the screen width. That is, the method includes first positioning the first section in the first document, and subsequently determining the position of the contents of other sections according to the positioned first section.

At 604, the method includes copying the second section to the position below the first section in the first document, and adjusting the second section to have the same display ratio as the first section.

After the position of the first section is determined, the second section is copied to the position below the first section in the first document. Then the second section is adjusted to have the same display ratio as the first section. As such, the first section and the second section can be naturally combined from top to bottom.

In some embodiments, the text content may not be appropriately edited and adjusted directly in the browser page opened in the original document. After the layout type of the first page is determined the same as the preset type, another new document is created. Then, the first section and the second section are separately copied to the newly created document, and the relative position between the first section and the second section is determined. As such, the position is ensured to be smoothly adjusted.

In other embodiments, adjusting the relative position of the first section and the second section to cause both of the first section and the second section to be visible when moving along the first direction in the display area includes the following processes. The image corresponding to the first page is opened in the image processing device. The second section is cut and then pasted to the first section from the bottom. The first section and the second section are displayed according to the screen width. In this situation, the text content may not be suitable for editing and adjusting directly in the browser page opened in the original document, therefore, image snipping/cutting is performed in the image processing device to combine the first section and the second section. As such, the position can also be ensured to be adjusted smoothly.

In still other embodiments, after adjusting the relative position between the first section and the second section, the data processing method further includes when detecting a second operation, returning to the first page. The second operation and the first operation of the above-described embodiments may correspond to each other. For example, when the first operation is the zoom-in operation, the second operation may be a zoom-out operation. When the first operation is switching from the horizontal display mode to the vertical display mode, the second operation may be switching from the vertical display mode to the horizontal display mode. After the user finishes reading the content of the first section, or when the user wants to exit during reading, the user may restore the first page using the second operation opposite to the first operation.

For simple description, above-described method embodiments are all expressed as a series of action combinations. However, those skilled in the art should know that the present disclosure is not limited by the described action sequence, since according to the present disclosure, some processes may be performed in other orders or simultaneously. Secondly, those skilled in the art should also be aware that embodiments described in the specification are only some embodiments not all embodiments, and the actions and modules involved may not be necessary for the present disclosure.

The above-described embodiments of the present disclosure describe the method in detail. The method of the present disclosure may be implemented by various forms of devices. Therefore, the present disclosure further provides a device, which is described in detail in following embodiments.

Figure 7:
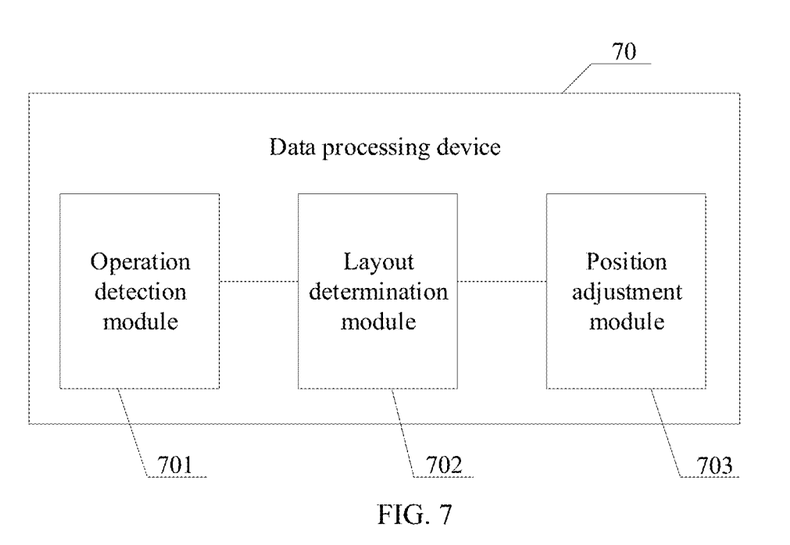
FIG. 7 illustrates a schematic structural diagram of a data processing device according to some embodiments of the present disclosure.

FIG. 7 illustrates a schematic structural diagram of a data processing device according to some embodiments of the present disclosure. As shown in FIG. 7, a data processing device 70 includes the following modules.

An operation detection module 701 is configured to detect whether a first operation for a first page is triggered.

In some embodiments, the first operation is not fixedly limited. In some embodiments, the first operation may be an operation indicating that the user wants to read the content of the first page in detail.

A layout determination module 702 is configured to determine the layout type of the first page when the operation detection module 701 detects the first operation for the first page. The first page at least includes a first section and the second section.

The first page may include a browser page or image display page of any document. The document may include but is not limited to word-containing content such as a journal, a magazine, a paper, a newspaper, etc. The first page at least includes the first section and the second section. A display area of the first section and a display area of the second section have an apparent dividing border. The border may include a visible border, such as a column dividing line. The border may include an invisible border, for example, a gap with a certain distance between the first section and the second section, which divides the first section and the second section.

A position adjustment module 703 is configured to adjust the relative position between the first section and the second section when the layout type is the same as the preset type. As such, both of the first section and the second section are visible when moving along the first direction in the display area.

In some embodiments, when the layout type of the first page is a normal single-page layout, that is, when the content of the document is arranged being displayed in sequence from top to bottom as a whole, no specific processing is needed.

When the layout type if the first page is same as the preset layout type, for the preset type such as a column display or a section layout, the data processing device controls and adjusts the relative position of the first section and the second section to cause both of the first section and the second section to be visible when moving along the first direction in the display area. As such, the user may read the content of the first page more conveniently.

In some embodiments, when the data processing device detects the first operation, and the layout type of the first page is the target type, the data processing device automatically adjusts the relative position of the content of different sections on the first page. As such, all content of the first page can be displayed along one direction in the display area, and the user does not need to repeatedly adjust the display content in the display area from different directions. Therefore, the user can read more smoothly, and the user reading experience is improved.

In the above-described embodiments, the first operation may be implemented differently in different embodiments. For example, in an embodiment, when the first operation is a zoom-in operation, the data processing device may be configured to detect whether the zoom-in operation for the first page is triggered. In another embodiment, when the first operation is a screen rotation operation, the data processing device may be configured to detect whether the display mode is switched from the horizontal display mode to the vertical display mode.

In the above-described embodiments, the first section and the second section may include a same first attribute. The first attribute may include but is not limited to width and font. That is, the first section and the second section have the same text format and layout width. In this case, the data processing device is configured to adjust the relative position between the first section and the second section to cause the second section to be below the first section. Since the width and font of the first section and the second section are the same, the second section may be directly aligned below the first section. As such, the transition from the first section to the second section is smooth and does not affect the user reading experience.

When adjusting the relative position of contents of various sections, to ensure the consistency of the text content of each of the sections, the data processing device may be configured to determine the sequence of the contents of various sections according to a certain rule. Therefore, the data processing device may be configured to determine an arrangement sequence of the first section and the second section according to the preset rule, and adjust the relative position between the first section and the second section according to the arrangement sequence to cause both of the first section and the second section to be visible when moving along the first direction in the display area.

Figure 8:
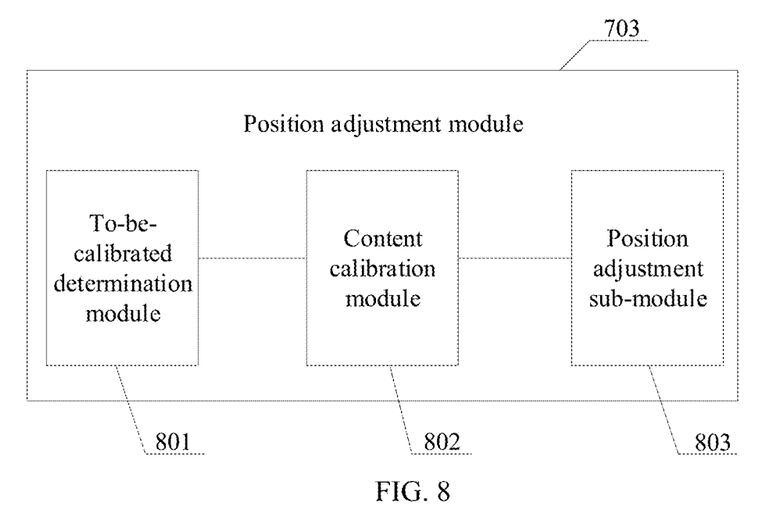
FIG. 8 illustrates a schematic structural diagram of a position adjustment module according to some embodiments of the present disclosure.

In practical applications, the first section and the second section may include different attributes. For example, the first page is a browser page of a photographed magazine image. Due to a photographing angle, the display content on the left side of the page and the display content on the right side of the page have different sizes caused by the column layout. In such a situation, the position adjustment module 703 may be implemented shown in FIG. 8. FIG. 8 illustrates a schematic structural diagram of a position adjustment module according to some embodiments of the present disclosure. As shown in FIG. 8, the position adjustment module 703 includes the following modules.

A to-be-adjusted determination module 801 is configured to determine the second section with a poorer display attribute as a to-be-adjusted section.

The display attribute may include font clarity, font size, etc. Because of the photographing angle of the image, the display content of a column at the close photographing point has a broader width and clearer font. The display content of a column at the far photographing point has a narrower width and blurrier font. In this situation, the column with the poorer display attribute (the display content of the column of the far photographing point) may be determined as the to-be-adjusted section. The display attribute of the to-be-adjusted section is optimized through a subsequent related calibration operation to facilitate the user to read.

A content calibration module 802 is configured to calibrate the second section according to the display attribute of the first section.

After determining the to-be-adjusted section, the content calibration module 802 may calibrate the display content with a poorer display attribute according to the corresponding attribute value of the display content with a better display attribute. As such, both sections are adjusted to have nearly the same display attributes.

A position adjustment sub-module 803 is configured to adjust the relative position between the first section and the adjusted second section to cause both of the first section and the adjusted second section to be visible when moving along the first direction in the display area.

After the content calibration module 802 adjusts the first section and the second section to have the same display attribute, the position adjustment sub-module 803 adjusts the relative position between the first section and the adjusted second section. As such, both of the first section and the adjusted second section are visible when moving along the first direction in the display area to facilitate the user to read.

In some embodiments, when the first attributes of the first section and the second section on the first page are different, the data processing device first calibrates the display content with the poorer display attribute according to the standard of the better display attribute. Then, the position adjustment module 703 adjusts the relative position between the first section and the second section to cause a similar view for the first section and the second section. As such, the user reading experience is improved.

Figure 9:
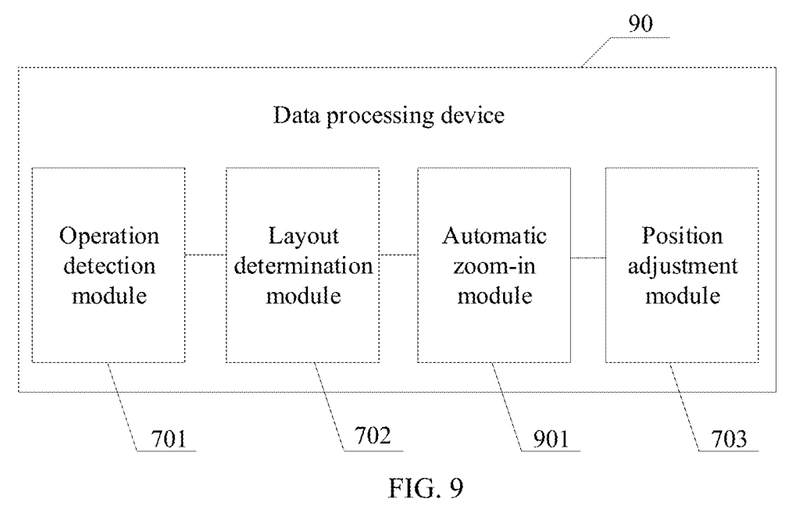
FIG. 9 illustrates a schematic structural diagram of another data processing device according to some embodiments of the present disclosure.

Based on the above-described embodiments of the present disclosure, FIG. 9 illustrates a schematic structural diagram of another data processing device according to some embodiments of the present disclosure. As shown in FIG. 9, a data processing device 90 includes the following modules.

An operation detection module 701 is configured to determine whether a first operation for the first page is triggered.

A layout determination module 702 is configured to determine the layout type of the first page when the operation detection module 701 detects the first operation for the first page. The first page at least includes a first section and a second section.

An automatic zoom-in module 901 is configured to automatically adjust the zoom ratio to cause the first section to adapt to the screen width for display.

Since the font of the display content in the column layout is usually small, to recognize the text content clearly, the user needs to adjust and enlarge the first page. In some embodiments, the automatic zoom-in module 901 may automatically adjust the zoom ratio to cause the content of the first section to adapt to the screen width for display. As such, when looking for the content of the first section, the user does not need to adjust the display page left and right but only adjust up and down.

A position adjustment module 703 is configured to adjust the relative position between the first section and the second section when the layout type is the same as the preset type. As such, both of the first section and the second section are visible when moving along the first direction in the display area.

In some embodiments, after detecting the first operation for the first page and determining the layout type of the first page, the data processing device may automatically adjust the zoom ratio. As such, the first content may adapt to the screen width for display, such that the user only needs to adjust the display content in the up and down direction to read the text of the first section and the second section. As such, the user reading experience is improved.

Figure 10:
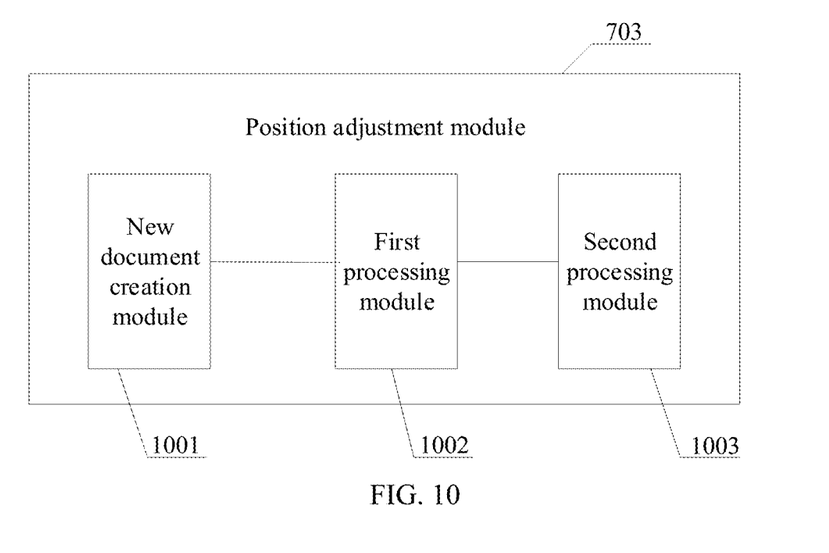
FIG. 10 illustrates a schematic structural diagram of another position adjustment module according to some embodiments of the present disclosure.

FIG. 10 illustrates a schematic structural diagram of another position adjustment module according to some embodiments of the present disclosure. As shown in FIG. 10, the position adjustment module 703 includes the following modules.

A new document creation module 1001 is configured to create a first document when the layout type is the same as the preset type.

A first processing module 1002 is configured to copy the first section to the first document. The first processing module 1002 is further configured to display the first section of the first document according to the screen width.

Before the user edits the display content of different sections on the first page, the first processing module 1002 needs to copy the first section to the first document and may display the first section of the first document according to the screen width. That is, the first processing module 1002 first positions the first section in the first document, and may subsequently determine the position if the content of other sections according to the positioned first section.

A second processing module 1003 is configured to copy the second section to the position below the first section in the first document and adjusts the second section to have the same display ratio as the first section.

After determining the position of the first section, the second processing module 1003 copies the second section to the position below the first section in the first document and adjusts the second section to have the same display ratio as the first section. As such, the first section and the second section are naturally combined from the top to the bottom.

In some embodiments, the text content may not be appropriately edited and adjusted directly in the browse page opened in the original document. After determining the layout type of the first page to be the same as the preset type, the new document creation module 1001 creates another new document. Then, the first processing module 1002 and the second processing module 1003 copies the first section and the second section separately to the created new document, and the position adjustment module determines the relative position between the first section and the second section. As such, the position adjustment module is ensured to adjust the position smoothly.

In other embodiments, the position adjustment module 703 may further be configured to open the image corresponding to the first page in the image processing device, cut and paste the second section to the first section from the bottom, and display the first section and the second section according to the screen width. In this situation, the text content may not be suitable for editing and adjusting directly in the browse page opened in the original document, therefore, the data processing device performs image cutting in the image processing device to combine the first section and the second section. As such, the position adjustment module is ensured to adjust the position smoothly.

In other embodiments, in addition to the operation detection module, the layout determination module, and the position adjustment module, the data processing device may further include a page restoration module. The page restoration module is configured to return to the first page when the second operation is detected. The second operation and the first operation of the above-described embodiments may correspond to each other. For example, when the first operation is the zoom-in operation, the second operation may be a zoom-out operation. When the first operation is switching from the horizontal display mode to the vertical display mode, the second operation may be switching from the vertical display mode to the horizontal display mode. After the user finishes reading the content of the first section, or when the user wants to exit during reading, the user may restore the first page using the second operation contrary to the first operation.

Embodiments of the present disclosure further provide an electronic apparatus. The electronic apparatus includes a processor and a memory. The memory is configured to store an executable instruction of the processor.

The executable instruction includes determining the layout type of the first page when detecting the first operation for the first page. The first page at least includes a first section and a second section. The instruction further includes adjusting the relative position between the first section and the second section if the layout type is the same as the preset type. As such, both the first section and the second section are visible when moving along the first direction in the display area.

The processor includes a kernel. The kernel retrieves a corresponding program module from the memory. One or more kernels may be set. Data processing may be realized by adjusting kernel parameters.

The memory may include non-permanent memory, random access memory (RAM) and/or non-volatile memory in a computer-readable medium, such as read-only memory (ROM) or flash memory (flash RAM). The memory includes at least one memory chip.

The present disclosure further provides a computer-readable storage medium, which stores a program. The program is executed by the processor to implement the following operation. The program is executed to determine the layout type of the first page when detecting the first operation for the first page. The first page at least includes a first section and a second section. The program is executed to adjust the relative position between the first section and the second section if the layout type is the same as the preset type. As such, both of the first section and the second section are visible when moving along the first direction in the display area.

In the present disclosure, a module may refer to one or more software programs, or a combination of software and hardware components. When executed by one or more processors, the software programs or the combination of software and hardware components implement the functions or steps of methods corresponding to the module.

Embodiments of the present disclosure are described in a progressive manner. Each embodiment focuses on the differences from other embodiments. The same or similar parts between embodiments may be referred to as each other. For the device disclosed in embodiments, since the device is corresponding to the method disclosed in embodiments, the description is relatively simple. The relevant part can be referred to as the description in method embodiments.

In the present disclosure, relational terms such as first and second are used only to distinguish one entity or operation from another entity or operation, and do not necessarily require or imply these entities or operations having any such actual relationship or order. Moreover, the terms "include," "contain," or any other variant thereof are intended to cover non-exclusive inclusion, so that a process, method, article or device that includes a series of elements includes not only those elements, but also those not explicitly listed, or other elements that are inherent to this process, method, article, or equipment. Without more restrictions, the element defined by the sentence "include one . . . " does not exclude that there are other identical elements in the process, method, article or equipment that includes the element.

The processes of the method or algorithm described in conjunction with the embodiments disclosed herein may be implemented directly by hardware, a software module executed by a processor, or a combination thereof. Software modules can be placed in random access memory (RAM), memory, read-only memory (ROM), electrically programmable ROM, electrically erasable and programmable ROM, registers, hard drives, removable disks, CD-ROMs, or a storage medium in any other forms well-known in the existing technology.

Above disclosed embodiments enable those skilled in the art to implement or use this application. Various modifications to these embodiments are apparent to those skilled in the art, and the general principles defined herein can be implemented in other embodiments without departing from the spirit or scope of the present disclosure. Therefore, the present disclosure is not limited to embodiments shown in the present specification, but should conform to the widest scope consistent with the principles and novel features disclosed in the specification.

What is claimed is:

1. A data processing method, comprising:
    detecting a first operation for a first page;
    determining a layout type of the first page, the first page including a first section and a second section, and determining the layout type of the first page including:
    in response to detecting a zoom-in operation, determining whether the layout type of the first page is a single-column layout or a multi-column layout; and
    in response to the layout type being the multi-column layout, adjusting a relative position between the first section and the second section so that both of the first section and the second section are visible when moving along a first direction in a display area and the first section and the second section being displayed:
  in different columns of the first page before the relative position between the first section and the second section is adjusted, and
  in a same column after the relative position between the first section and the second section is adjusted.

2. The method of claim 1, wherein determining the layout type of the first page further includes:
  in response to detecting a display mode switching from a horizontal display mode to a vertical display mode, determining the layout type of the first page.

3. The method of claim 1, wherein:
  the first section and the second section include a same first attribute, the first attribute includes a width and a font; and
  adjusting the relative position between the first section and the second section to cause both the first section and the second section to be visible when moving along the first direction in the display area includes:
    adjusting the relative position between the first section and the second section to cause the second section to be located below the first section.

4. The method of claim 1, wherein:
  the first section and the second section include different first attributes, a first attribute includes a width and a font; and
  adjusting the relative position between the first section and the second section to cause both of the first section and the second section to be visible when moving along the first direction in the display area includes:
    determining the second section with a poor display attribute as a to-be-adjusted section;
    adjusting the second section according to a display attribute of the first section; and
    adjusting the relative position between the first section and an adjusted second section to cause both of the first section and the adjusted second section to be visible when moving along the first direction in the display area.

5. The method of claim 1, after the layout type of the first page is determined, further comprising:
  automatically adjusting a zoom ratio to cause content of the first section to adapt to a screen width for display.

6. The method of claim 5, wherein adjusting the relative position between the first section and the second section to cause both of the first section and the second section to be visible when moving along the first direction in the display area includes:
  creating a first document;
  copying the first section to the first document, displaying the first section in the first document according to the screen width; and
  copying the second section to a position below the first section in the first document, and adjusting the second section to have a same display ratio as the first section.

7. The method of claim 1, wherein adjusting the relative position between the first section and the second section to cause both of the first section and the second section to be visible when moving along the first direction in the display area includes:
  opening an image corresponding to the first page in an image processing device;
  cutting the second section and pasting the second section to a position below the first section; and
  displaying the first section and the second section according to a screen width.

8. The method of claim 1, after the relative position between the first section and the second section is adjusted, further comprising:
  in response to detecting a second operation, returning to the first page.

9. A data processing device, comprising:
  an operation detection module configured to detect a first operation for a first page;
  a layout determination module configured to determine a layout type of the first page, the first page including a first section and a second section, and determining the layout type of the first page including:
    in response to detecting a zoom-in operation, determining whether the layout type of the first page is a single-column layout or a multi-column layout; and
  a position adjustment module configured to, in response to the layout type being the multi-column layout, adjust a relative position between the first section and the second section so that both of the first section and the second section are visible when moving along a first direction in a display area, and the first section and the second section being displayed:
    in different columns of the first page before the relative position between the first section and the second section is adjusted, and
    in a same column after the relative position between the first section and the second section is adjusted.

10. The device of claim 9, wherein the layout determination module is further configured to:
  in response to detecting a display mode switching from a horizontal display mode to a vertical display mode, determine the layout type of the first page.

11. The device of claim 9, wherein the first section and the second section include a same first attribute, the position adjustment module is further configured to:
  adjust the relative position between the first section and the second section to cause the second section to be located below the first section.

12. The device of claim 9, wherein the first section and the second section include different first attributes, the position adjustment module includes:
  a to-be-adjusted determination module configured to determine the second section with a poor display attribute as a to-be-adjusted section;
  a content calibration module configured to adjust the second section according to a display attribute of the first section; and
  a position adjustment sub-module configured to adjust the relative position between the first section and an adjusted second section to cause both of the first section and the adjusted second section to be visible when moving along the first direction in the display area.

13. The device of claim 9, further comprising:
  an automatic zoom-in module configured to automatically adjust a zoom ratio to cause content of the first section to adapt to a screen width for display.

14. The device of claim 13, wherein the position adjustment module includes:
  a new document creation module configured to create a first document;
  a first processing module configured to copy the first section to the first document, adaptively display the first section in the first document according to the screen width; and
  a second processing module configured to copy the second section to a position below the first section in the first document, and adjust the second section to have a same display ratio as the first section.

15. The device of claim 9, wherein the position adjustment module is further configured to:
open an image corresponding to the first page in an image processing device;
cut the second section and paste the second section to a position below the first section; and
display the first section and the second section according to a screen width.

16. The device of claim 9, further comprising:
a page restoration module configured to, in response to detecting a second operation, return to the first page.

17. A data processing method, comprising:
detecting a first operation for a first page;
determining a layout type of the first page, the first page including a first section and a second section, the first section and the second section including different first attributes, a first attribute including a width and a font; and
in response to the layout type being same as a preset type, adjusting a relative position between the first section and the second section so that both of the first section and the second section are visible when moving along a first direction in a display area, including:
determining the second section with a poor display attribute as a to-be-adjusted section;
adjusting the second section according to a display attribute of the first section; and
adjusting the relative position between the first section and an adjusted second section to cause both of the first section and the adjusted second section to be visible when moving along the first direction in the display area.

* * * * *